United States Patent
Hammond et al.

(10) Patent No.: US 12,515,229 B2
(45) Date of Patent: Jan. 6, 2026

(54) INJECTION VALVE

(71) Applicant: FISHER CONTROLS INTERNATIONAL LLC, Marshalltown, IA (US)

(72) Inventors: Christopher J. Hammond, Marshalltown, IA (US); Cory J. Hagen, Johnston, IA (US); Trevor Stoakes, Peculiar, MO (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 0 days.

(21) Appl. No.: 17/571,406

(22) Filed: Jan. 7, 2022

(65) Prior Publication Data

US 2023/0094801 A1    Mar. 30, 2023

Related U.S. Application Data

(60) Provisional application No. 63/250,802, filed on Sep. 30, 2021.

(51) Int. Cl.
*B05B 1/30* (2006.01)
*F16K 1/42* (2006.01)

(52) U.S. Cl.
CPC .............. *B05B 1/3086* (2013.01); *F16K 1/42* (2013.01)

(58) Field of Classification Search
CPC .......... F16K 1/42; F16K 5/0407; F16K 1/485; F16K 1/54; F16K 1/52; B05B 1/3086
USPC ............. 239/584; 251/357, 122; 137/614.11, 137/625.3
See application file for complete search history.

(56) References Cited

U.S. PATENT DOCUMENTS

| | | | | |
|---|---|---|---|---|
| 1,123,079 A | * | 12/1914 | Bowman | F16K 19/00 48/180.1 |
| 3,746,305 A | * | 7/1973 | Zakka | F16K 1/422 251/360 |
| 4,706,487 A | * | 11/1987 | Bandou | B21K 1/20 72/353.4 |
| 5,297,777 A | * | 3/1994 | Yie | B24C 5/02 251/324 |
| 5,516,079 A | * | 5/1996 | Baumann | F16K 31/126 137/625.3 |

(Continued)

OTHER PUBLICATIONS

Fisher SS-83 Angle Valve Instruction Manual, Emerson Process Management, Mar. 2013.

*Primary Examiner* — Qingzhang Zhou
*Assistant Examiner* — Kevin Edward Schwartz
(74) *Attorney, Agent, or Firm* — MARSHALL, GERSTEIN & BORUN LLP

(57) ABSTRACT

An injection valve including a valve body defining an inlet, an outlet, and a fluid flow path connecting the inlet and the outlet. A valve shaft is disposed in the valve body, and a valve plug is operatively connected to the valve shaft. The valve plug is movable between an open position, in which the valve plug permits fluid flow between the inlet and the outlet, and a closed position, in which the valve plug limits flow between the inlet and the outlet. A seat ring defines a valve seat and is proximally disposed relative to the outlet of the valve body. The valve plug moves away from the valve seat when moving in a direction toward the valve body, and toward the valve seat when moving in a direction away from the valve body.

9 Claims, 11 Drawing Sheets

(56) References Cited

U.S. PATENT DOCUMENTS

| | | | | |
|---|---|---|---|---|
| 6,056,270 | A * | 5/2000 | Zimmerly | F16K 1/38 251/356 |
| 7,363,941 | B2 * | 4/2008 | Caprera | F16K 47/04 137/625.3 |
| 9,022,071 | B2 * | 5/2015 | Venkitasubramony | F16K 3/246 137/625.37 |
| 10,753,481 | B2 * | 8/2020 | Kubota | F16K 1/48 |
| 2006/0130911 | A1 * | 6/2006 | Caprera | F16K 47/04 137/614.11 |
| 2006/0255308 | A1 * | 11/2006 | Weissinger | F16K 1/485 251/356 |
| 2007/0040136 | A1 * | 2/2007 | Caprera | F16K 1/54 251/122 |
| 2013/0276924 | A1 * | 10/2013 | Venkitasubramony | F16K 1/54 137/625.37 |
| 2015/0083244 | A1 * | 3/2015 | Naziri | F16K 31/508 251/127 |
| 2018/0010696 | A1 * | 1/2018 | Wang | F16K 47/08 |
| 2018/0058589 | A1 * | 3/2018 | Kubota | F16K 1/485 |
| 2022/0243824 | A1 * | 8/2022 | Pang | F16K 1/54 |

\* cited by examiner

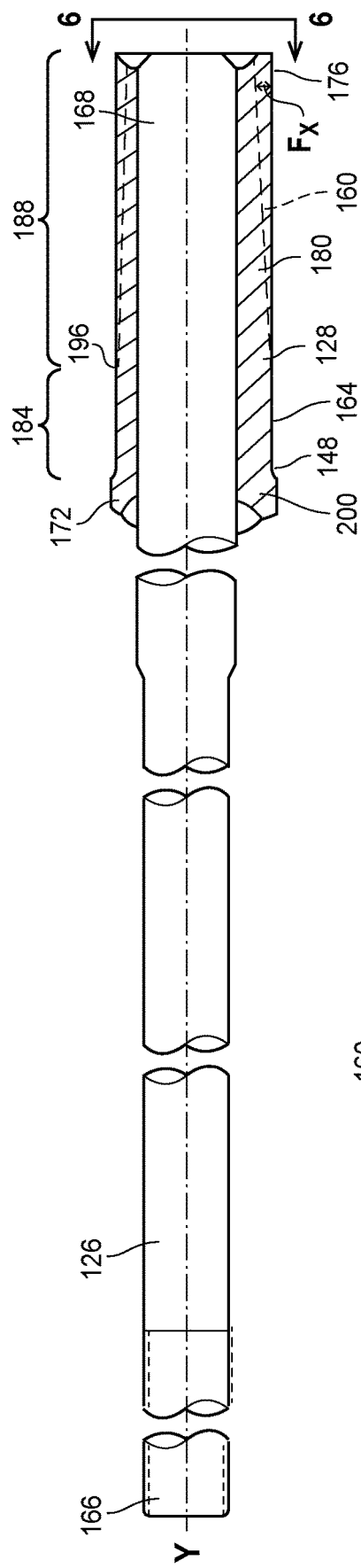
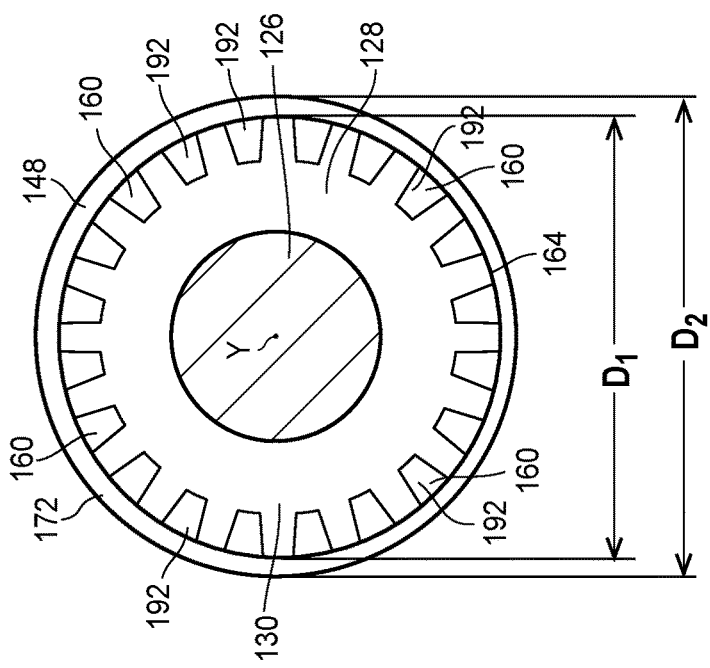
FIG. 5
FIG. 6

INJECTION VALVE

FIELD OF DISCLOSURE

The present disclosure relates to a valve, and in particularly, an injection valve.

BACKGROUND

Control valves are commonly used in process control systems to control the flow of process fluids. A control valve typically includes an actuator apparatus (e.g., a pneumatic actuator, a hydraulic actuator, etc.) operatively coupled to the flow control member of a fluid valve to automate the control valve. In operation, a controller is often employed to supply a control fluid to the actuator, which, in turn, positions the flow control member (e.g., a valve gate, a plug, a closure member, etc.) to a desired position relative to a valve seat to control or regulate the fluid flow through the valve.

In some injection systems, a fluid may be processed by mixing different elements as they flow from the valve body and enter a tank. For example, an angle valve in FIG. 1 is mounted onto a tank (not shown) to mix compressible gas, liquid, and solid slurry as these elements exit the valve 10 and into the tank. As shown in FIG. 1, the angle valve 10 includes a valve body 12 defining a fluid flow path 14 that extends from an inlet 16 to an outlet 18 of the valve body 12. A packing assembly 20 is coupled to the valve body 12 and covers an opening 22 in which a valve stem 24 is disposed. At a distal end of the valve stem 24, a valve plug 26 is movable in and out of sealing contact with a valve seat 30 defined by a seat ring 32. The seat ring 32 is at least partially disposed in the valve body 12 and extends outwardly relative to the valve body 12 from the outlet 18. The valve 10 is arranged for attachment to a tank at the outlet 18 so that the valve plug 26 opens into the tank (i.e., moves downward in FIG. 1) when the valve plug 26 moves away from the valve seat 30 in a direction A. To close the valve 10, the valve stem 24 moves the plug 26 toward the valve body 12 in a direction B to engage the valve seat 30. As shown in the orientation of FIG. 1, this exemplary valve may be described as a flow-down, pull-to-close valve.

The valve 10 operates by moving the valve stem 24 along the X axis so that the plug 26 moves away from the valve seat 30 to open the valve 10, and moves into sealing engagement with the valve seat 30 to close the valve 10. In operation, a controller (not shown) may provide a control signal to an actuator (not shown) operably coupled to the valve stem 24. This control signal causes the actuator to move the valve stem 24 such that the plug 26 moves relative to the valve seat 30 to control fluid flow through the valve body 12. Typically, valve plugs for injection valves are generally short in length to reduce dead band. As shown in FIG. 1, the valve plug 26 is a micro-flat valve plug, which is precision-machined to provide a small angled opening for single throttling a low flow process fluid. In this example, the valve plug 26 opens by moving the valve plug 26 in the A direction, away from the valve body 12 and into the tank, and closes by moving the valve plug 26 in the direction B, opposite the A direction, towards the valve body 12 until the valve plug 26 engages the valve seat 30.

SUMMARY

In a first aspect of the present disclosure, an injection valve may include a valve body defining an inlet, an outlet, and a fluid flow path connecting the inlet and the outlet. A valve shaft may be disposed in the valve body, and a valve plug may be operatively connected to the valve shaft. The valve plug may be movable between an open position, in which the valve plug permits fluid flow between the inlet and the outlet, and a closed position, in which the valve plug limits flow through the outlet. A seat ring may be operatively coupled to the outlet of the valve body and the seat ring may define a valve seat. The valve plug may move away from the valve seat when the valve plug moves in a direction toward the valve body and the valve plug may move toward the valve seat when the valve plug moves in a direction away from the valve body.

In a second aspect of the present disclosure, a valve trim assembly for an injection valve may include a valve plug including a seating surface and a plurality of grooves formed on an exterior surface of the valve plug. A seat ring may include a first end, a second end opposite the first end, and a bore extending between the first and second ends. The first end may be operatively coupleable to a valve body and the bore may be sized to slidably receive the valve plug. The bore may define a valve seat arranged to sealingly engage with the seating surface of the valve plug. When the seating surface of the valve plug engages the valve seat of the seat ring, the plurality of grooves of the valve plug may be externally located relative to the second end of seat ring.

In a third aspect of the present disclosure, an injection valve may include a valve body defining an inlet, an outlet, and a fluid flow path connecting the inlet and the outlet. A valve shaft may be disposed in the valve body. A valve plug may be operatively connected to the valve shaft and may be movable between an open position, in which the valve plug permits fluid flow between the inlet and the outlet, and a closed position, in which the valve plug limits flow between the inlet and the outlet. A seat ring may be coupled to the outlet of the valve body and may define a valve seat. The valve plug may move away from the valve seat when the valve plug moves in a direction toward the valve body and the valve plug moves toward the valve seat when the valve plug moves in a direction away from the valve body. One or more of the seat ring and the valve body may include a channel arranged to receive a heat exchange fluid.

In further accordance with any one or more of the foregoing first, second, or third aspects, an injection valve or valve trim may further include any one or more of the following aspects.

In one example, the valve plug may include a first end defining a seating surface and a second end opposite the first end.

In some cases, when the valve is in the closed position, the seating surface may engage the valve seat and the second end may extend away from the valve body.

In another example, the valve plug may include a body extending between the first and second ends.

In some cases, the valve plug may include a smooth portion proximal to the first end and a grooved portion proximal to the second end.

In some examples, the grooved portion may include a plurality of grooves disposed around a circumference of the valve plug.

In some examples, the smooth portion of the body of the valve plug may extend between the seating surface and the grooved portion.

In another example, the grooved portion may extend between the smooth portion and the second end such that the grooved portion may be externally located relative to the valve body when the valve plug is in the closed position.

In one example, one or more of the plurality of grooves may include a variable depth relative to an exterior surface of the body of the valve plug.

In another example, the plurality of grooves may partially define a plurality of passages with the valve seat when the valve plug is in the open position.

In some examples, the valve seat may include a first portion disposed within the valve body and a second portion extending from the valve body.

In one example, a channel may be disposed in a wall of the valve body and arranged to receive a heat exchange fluid.

In another example, the seat ring may include a channel disposed in a wall of the seat ring and may be arranged to receive a heat exchange fluid.

In some examples, a ratio of length of the smooth portion to length of the grooved portion may be in a range of approximately 1:5 to approximately 1:2.

In one example, one or more of the plurality of grooves may be partially elliptical with an apex adjacent to the smooth portion of the body of the valve plug.

In another example, one or more of the plurality of grooves may increase in width and depth from the apex to a location spaced from the apex.

In some examples, one or more of the plurality of grooves may extend at a uniform depth and width from the location spaced from the apex to the second end of the valve plug.

In one example, one or more of the plurality of grooves may increase in one or more of width and depth from the smooth portion to the second end of the plug.

In another example, the valve seat may be disposed between the first and second ends of the seat ring.

In some examples, a plurality of channels may be defined between the seat ring and the valve plug when the seating surface of the valve plug is spaced from the valve seat.

BRIEF DESCRIPTION OF THE DRAWINGS

FIG. 5 is a side view of a valve stem and valve plug of the valve trim assembly of FIG. 2;

FIG. 6 is a magnified, bottom view of the valve stem and valve plug of FIG. 5 taken at 6-6;

DETAILED DESCRIPTION

The present disclosure is generally directed to an injection valve, valve plug, and valve trim assembly arranged to provide uniform distribution of process fluid into a tank for mixing within the tank. The disclosed injection valve minimizes occurrences of the process fluid solidifying in the valve and on the valve plug, thereby decreasing costs related to maintenance and valve failure.

Figure 2:
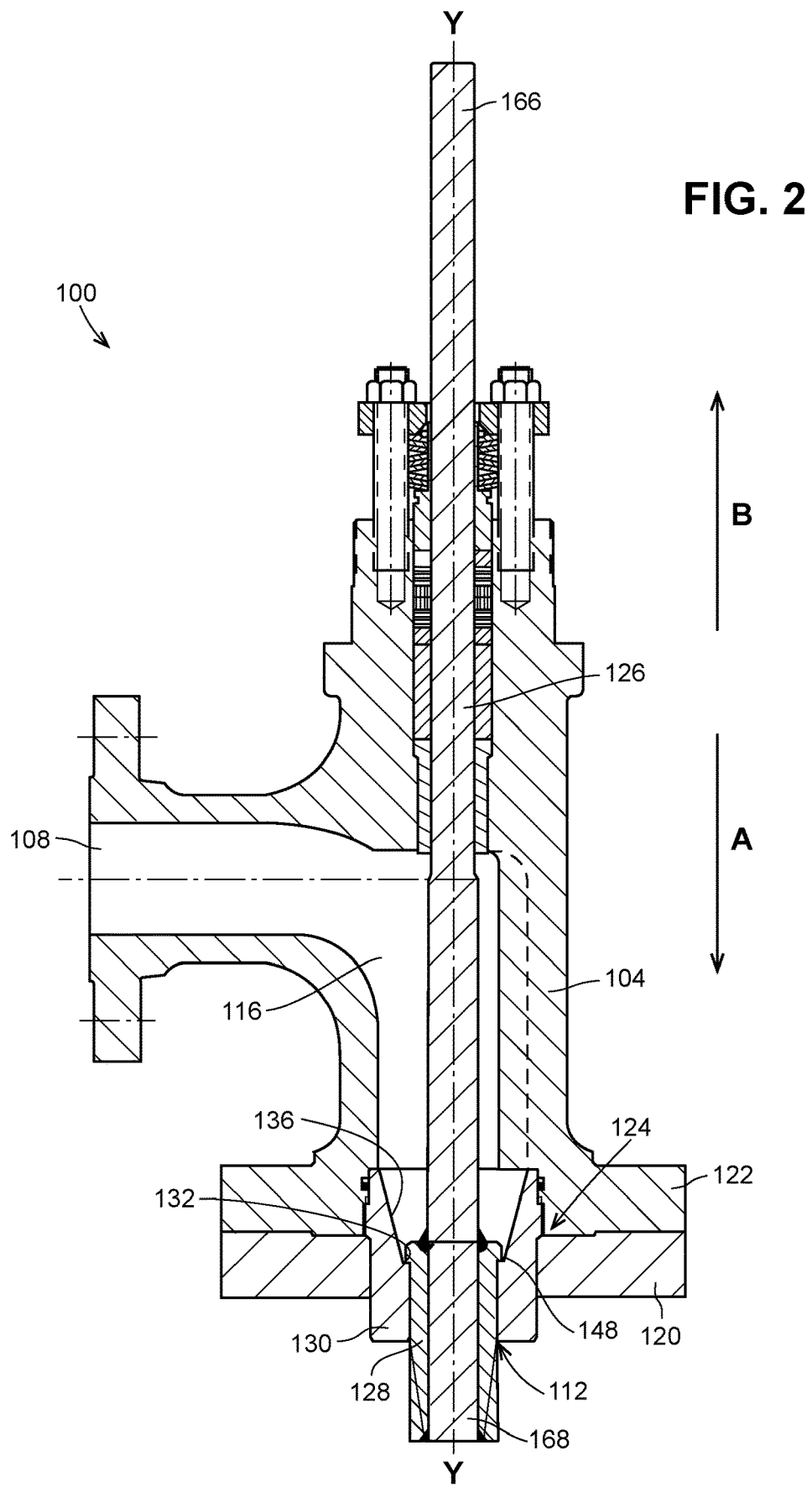
FIG. 2 is cross-sectional view of an injection valve assembled in accordance with the teachings of the present disclosure, showing the valve in a closed position.

In FIG. 2, a first exemplary injection valve 100 is constructed in accordance with the teachings of the present disclosure. The valve 100 includes a valve body 104 defining an inlet 108, an outlet 112, and a fluid flow path 116 connecting the inlet 108 and the outlet 112. At the outlet 112 of the valve 100, a tank mounting pad 120 is coupled to an outlet flange 122 of the valve body 104 and is arranged to engage an exterior surface of a tank when the valve 100 is coupled to a tank. A valve trim assembly 124 includes a valve shaft 126 disposed in the valve body 104, a valve plug 128 operatively coupled to the valve shaft 126, and a seat ring 130 operatively coupled to the valve body 104 at the outlet 112. In the illustrated example, the fluid flow path 116 curves at an angle of approximately 90 degrees, and the valve shaft 126 moves the valve plug 128 along a longitudinal axis Y to move the valve plug 128 toward and away from a valve seat 132 defined by the seat ring 130 to close and open the valve 100, respectively.

Figure 3:
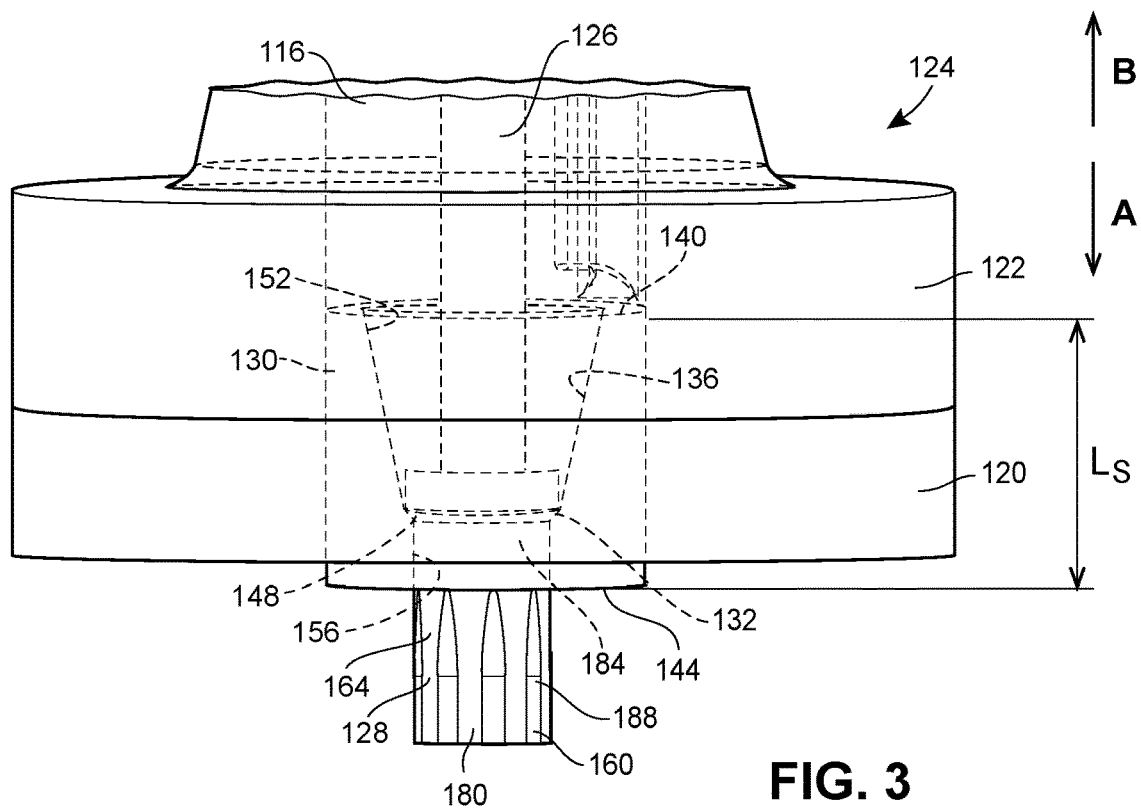
FIG. 3 is a partial side view of a valve trim assembly of the injection valve of FIG. 2.
Figure 4:
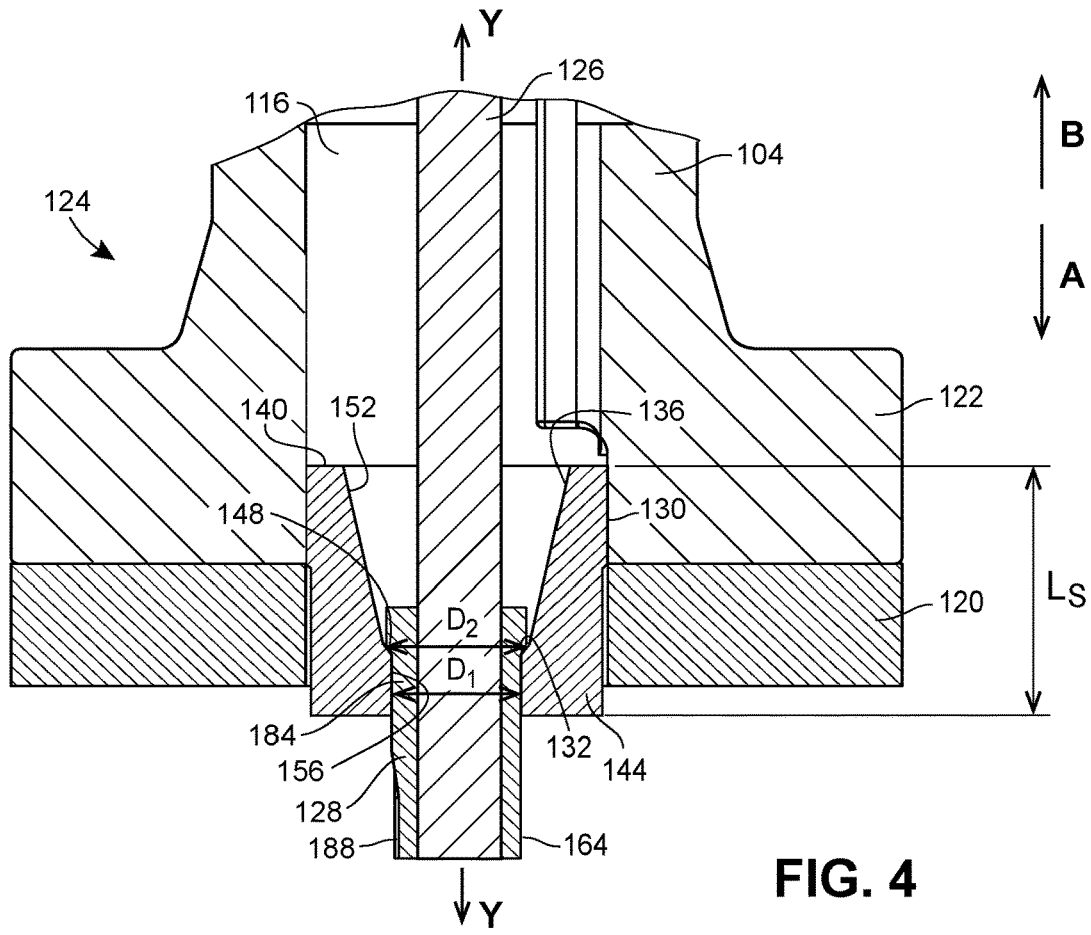
FIG. 4 is a partial cross-sectional side view of the trim assembly of FIG. 3.

The valve plug 128 is movable between an open position, in which the valve plug 128 permits fluid flow between the inlet 108 and the outlet 112, and a closed position, as shown in FIGS. 2-4, in which the valve plug 128 limits flow through the outlet 112 by engaging the valve seat 132 of the seat ring 130. The seat ring 130 is disposed in the outlet 112 of the valve body 104 and includes an interior bore 136 that defines the valve seat 132. The valve plug 128 disengages from the valve seat 132 when the valve plug 128 moves in a direction B (upward in FIG. 2) toward the valve body 104, and the valve plug 128 moves toward the valve seat 132 when the valve plug 128 moves in a direction A (downward), opposite direction B, away from the valve body 104. Relative to the orientation depicted in FIG. 2, the injection valve 100 is a "push-to-close" valve 100 such that the valve 100 closes when the plug 128 is pushed in the A direction.

FIGS. 3 and 4 illustrate the valve trim 124 assembly of the injection valve of FIG. 2 in more detail. In the closed position, the valve plug 128 is in sealing engagement with the valve seat 132 of the seat ring 130. The seat ring 130 includes a first end 140, a second end 144 opposite the first end 140, and the bore 136, which extends between the first and second ends 140, 144. The bore 136 of the seat ring 130 is in fluid communication with the flow path 116 of the valve body 104. The first end 140 of the seat ring 130 is operatively coupled to the valve body 104 and at least partially disposed within the outlet 112 of the valve 100. The second end 144 extends from the valve body 104. However, in other examples, the seat ring 130 may be completely disposed within the valve body 104, or attached to an exterior surface of the valve body 104.

In FIGS. 3 and 4, the bore 136 of the seat ring 130 is sized to slidably receive the valve plug 128, and defines the valve seat 132 that sealingly engages with a seating surface 148 of the valve plug 128. The valve seat 132 is disposed between the first and second ends 140, 144 of the seat ring 130. The bore 136 includes a conical portion 152, a cylindrical portion 156, and the valve seat 132 positioned between the conical and cylindrical portions 152, 156. The cylindrical portion 156 of the bore 136 has a diameter D1, which is less than a diameter D2 of the plug 128 at the seating surface 148. At the first end 140 of the seat ring 130, an opening has a diameter D3, larger than the diameter D2 of the plug 128 at the seating surface 148. As such, the seating surface 148 of the plug 128 cannot pass through the cylindrical portion 156 of the bore 136, but can fully withdraw into the conical portion 152 of the bore 136 of the seat ring 130. The conical portion 152 is truncated and funnel-shaped to facilitate mixing and dispensing a process fluid through the outlet 112 of the valve 100.

Figure 1:
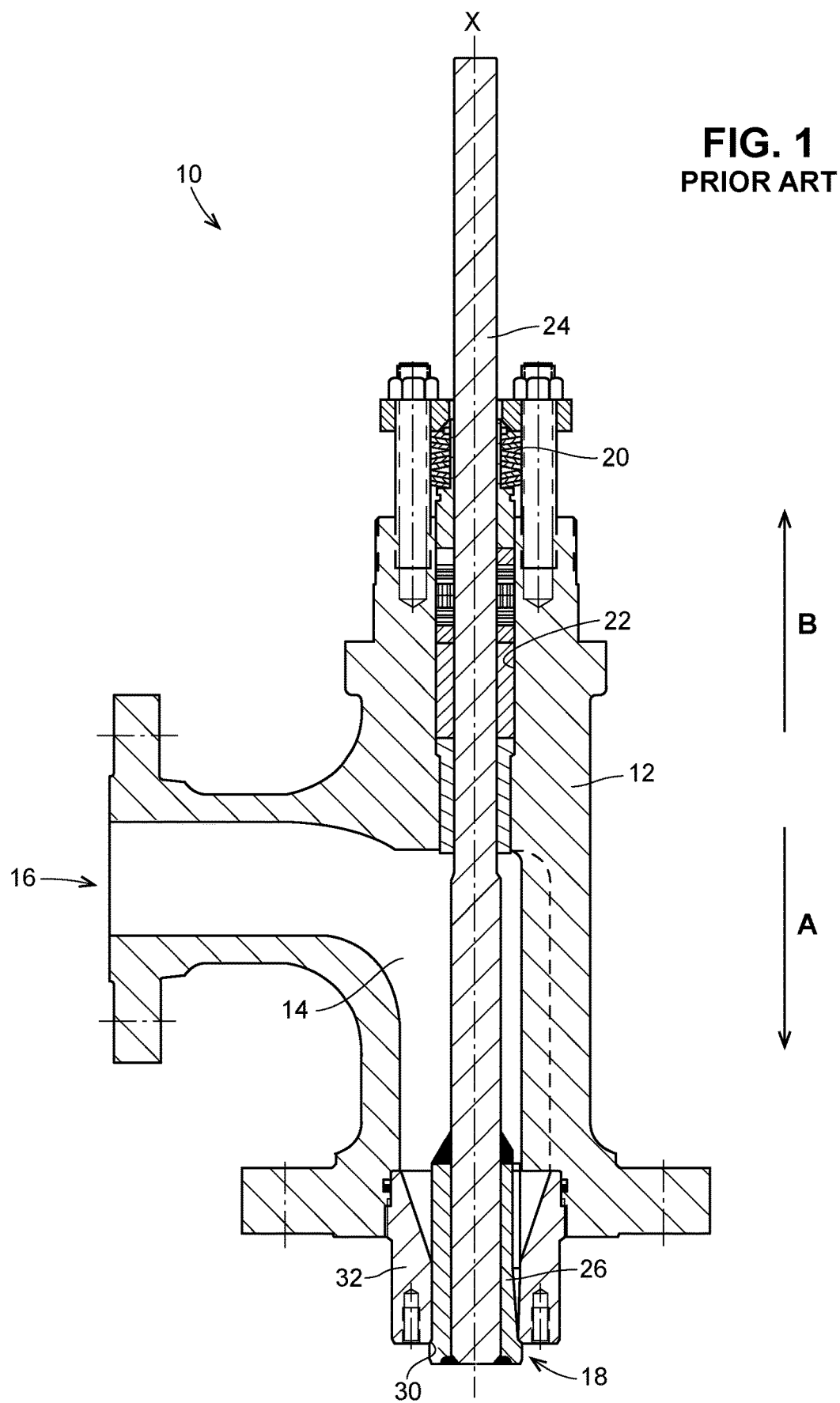
FIG. 1 is a cross-sectional view of a conventional injection valve for mounting onto a tank, showing the valve in a closed position.

In FIG. 3, the seating surface 148 of the plug 128 engages the valve seat 132 to fully close the valve 100. In the closed position, a plurality of grooves 160 defined in an exterior surface 164 of the plug 128 are entirely disposed outside of the cylindrical portion 156 of the bore 136 of the seat ring 130 and the valve body 104. As will be described further below with reference to FIGS. 11-13, as the valve 100 moves into an open position, the stem 126 pulls the plug 128 in the B direction (FIG. 1) into the bore 136 of the seat ring 130 so that the grooves 160 move toward the valve body 104 and adjacent to the bore 136. In an open position, the grooves 160 and the seat ring 130 together define a plurality of channels in fluid communication with the fluid flow path 116 of the valve 100, thereby permitting the flow of process fluid through the bore 136 of the seat ring 130, around the valve plug 128, and through the channels and the outlet 112 of the valve 100.

Generally, FIGS. 5 and 6 illustrate the valve stem 126 and the valve plug 128 of the valve trim assembly 124. The valve stem 126 includes a first end 166 and a second end 168 opposite the first end 164. At the second end 168, the valve stem 126 is fixedly coupled to the valve plug 128. In the illustrated example, the valve stem 126 extends through an interior bore of the valve plug 128 and terminates at a distal end 176 of the plug 128. However, in other examples, the valve plug 128 may be solid and coupled to the second end 168 of the valve stem 126 by other suitable methods and configurations (e.g., mounted). The valve plug 128 includes a first end 172 defining the seating surface 148, a second end 176 opposite the first end 172, and a body 180 extending between the first and second ends 172, 176. The body 180 includes a smooth or dead band portion 184 and a grooved portion 188 that channels and shapes fluid flow around the valve plug 128 when the valve 100 is open. The smooth portion 184 is proximal to the first end 172 and extends between the seating surface 148 and the grooved portion 188 to provide a dead band, as will be explained in further detail below. The grooved portion 188 extends between an end 196 of the dead band portion 184 and the second end 176 of the valve plug 128. Turning briefly back to FIG. 3, the grooved portion 188 of the valve plug 128 is sized so that the plurality of grooves 160 are externally located relative to the valve body 104 and the seat ring 130 when the valve 100 is in the closed position.

Turning once again to FIG. 6, the grooved portion 188 of the valve plug 128 includes the plurality of grooves 160 carved into an exterior surface 164 of the body 180 of the valve plug 128. The plurality of grooves 160 are uniformly spaced about the circumference of the body 180, and have smooth, curved surfaces. The plurality of grooves 160 of the plug 128 and the interior bore 136 of the seat ring 130 together define a plurality of channels 192 to more evenly distribute fluid flow from the valve 100 and into a tank when the valve 100 is open. Referring back to FIG. 5, the grooves 160 extend from the end 196 of the smooth portion 184 (i.e., an apex of a groove) the second end 176 of the plug 128.

Figure 7:
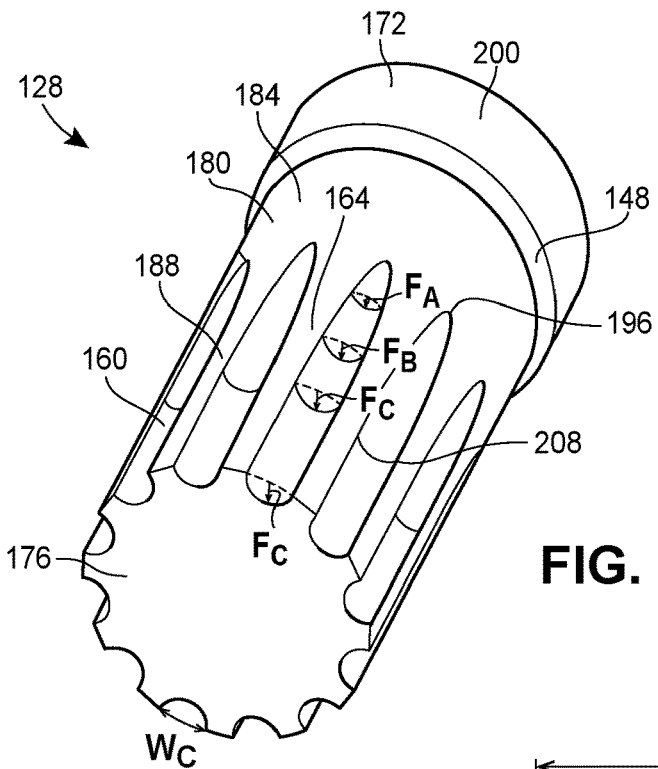
FIG. 7 is a perspective bottom view of a first exemplary valve plug of FIG. 2.

As shown in a dashed profile of FIG. 5, a depth $F_x$ of each groove 160 increases from the apex 196 (i.e., the end of the smooth portion 184) of the groove 160 to the second end 176 of the plug 128. FIG. 7 also illustrates the variable depth $F_x$ of each groove as the groove extends from the apex 196 to a location 208 spaced from the apex 196. As shown in the illustrated example, the depth $F_x$ increases from the apex to the second location 208 such that a first exemplary depth $F_A$ is less than $F_B$, which is less than $F_C$. In the illustrated example, the depth $F_C$ at the location 208 spaced from the apex 196 remains constant from the location 208 to the second end 176 of the plug 128. However, in other examples, the depth F of each groove 160 may be uniform or may increase for a different length and then remain at a uniform depth for a particular length, or may steadily increase from the apex 196 to the second end 176 of the plug 128.

Figure 8:
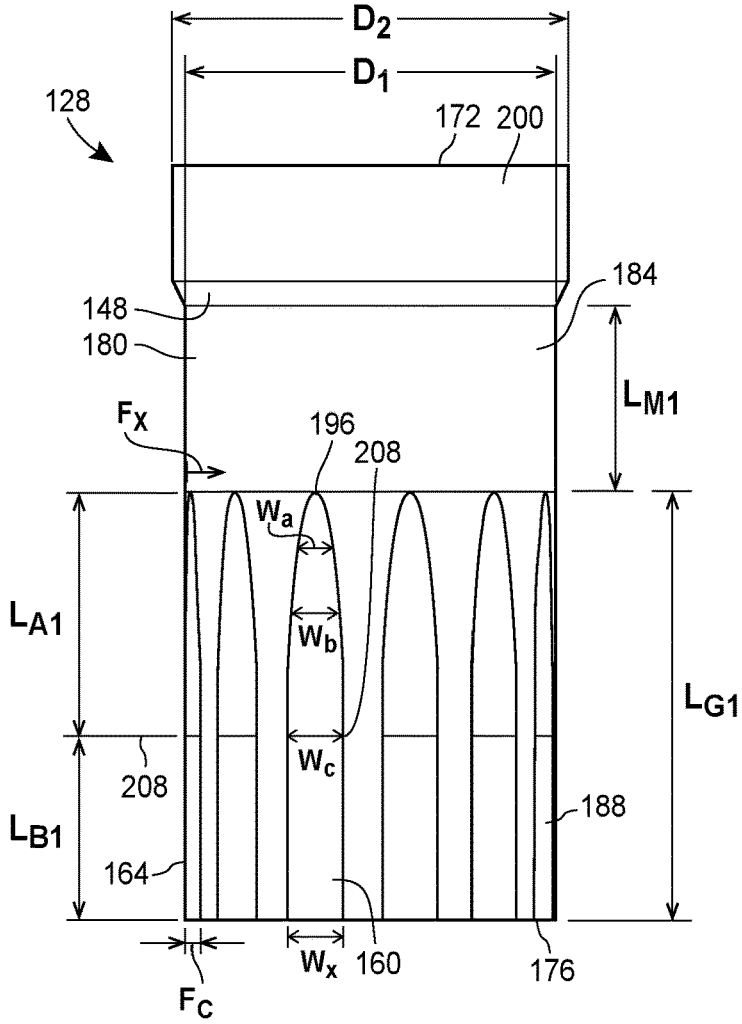
FIG. 8 is a side view of the valve plug of FIG. 2.

In FIGS. 7 and 8, the valve plug 128 is shown in more detail. The first end 172 includes a cylindrical collar 200 that tapers into the smooth portion 184 of the plug 128. The seating surface 148 is defined by the taper, and includes an angled surface that is shaped to engage the valve seat 132 of the seat ring 130. As shown in FIG. 8, the smooth portion 184 extends for a length $L_{M1}$, and the grooved portion 188 extends for a length $L_{G1}$. A ratio of the length of the smooth portion $L_M$ to length of the grooved portion $L_G$ is in a range of approximately 1:5 to approximately 1:2.

Each of the plurality of grooves 160 is partially elliptical with the apex 196 adjacent to the smooth portion 184 of the body 180 of the valve plug 128. The apex 196 initiates the beginning of the grooved portion 188, and therefore is also referred to as the end of the smooth portion 184. The length $L_{G1}$ of the grooved portion 188 may be divided into a non-uniform portion $L_{A1}$ and a uniform portion $L_{B1}$, with respect to both width $W_x$ and depth $F_x$ (relative to an outer surface 164 of the plug body 180) of each groove 160. For example, each of the plurality of grooves 160 increases in width $W_x$ or depth $F_x$ from the smooth portion 184 to the second end 176 of the plug 128. The non-uniform portion $L_{A1}$ extends from the apex 196 to a location 208 spaced from the apex 196, and has a gradually increasing depth (e.g., FA, FB, FC) and width (e.g., WA, WB, WC). The uniform portion $L_{B1}$ of each groove 160 extends from the location 208 to the second end 176 of the plug 128, and has a uniform depth $F_C$ and a uniform width $W_C$. However, in other examples, the shape, depth, and width may be different than what is illustrated to achieve certain flow characteristics of the valve 100.

As will be described further below, the dead band portion 184 of the plug 128 represents the amount of travel that the plug 128 moves before permitting fluid to flow through the outlet 112 of the valve 100. For example, the plug 128 blocks fluid flow through seat ring 130 and outlet 112 until the plug 128 moves to a position where the grooved portion 188 is adjacent to the cylindrical portion 156 of the bore 136 of the seat ring 130. The dead band portion 184 of the plug 128 and the cylindrical portion 156 of the bore 136 have similar diameters such that fluid cannot seep between the dead band portion 184 of the plug 128 and the seat ring 130.

The length $L_M$ of the dead band portion 184 may be modified to achieve a particular dead band of the valve 100. A plug 128 having a shorter dead band portion 184, for example, would permit the valve 100 to open more quickly than a valve 100 with a plug 128 having longer dead band portion 184. In some applications, a short dead band portion 184 may be desirable such that the reaction time between transmitting a signal to open the valve 100 and the opening of the valve 100 is short. However, in a polymer injection valve application, a plug 128 having a longer dead band portion 184 may be desirable to keep the grooved portion 188 of the plug 128 externally located relative to the valve body 104 when the valve 100 is in the closed position.

Figure 9:
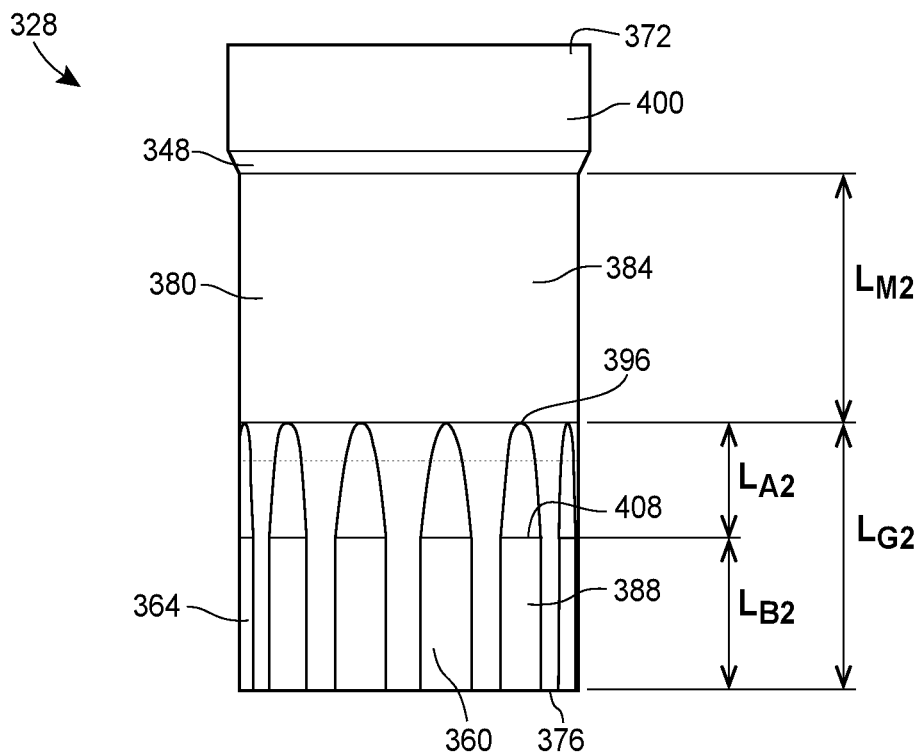
FIG. 9 is a second exemplary valve plug assembled in accordance with the teachings of the present disclosure.
Figure 10:
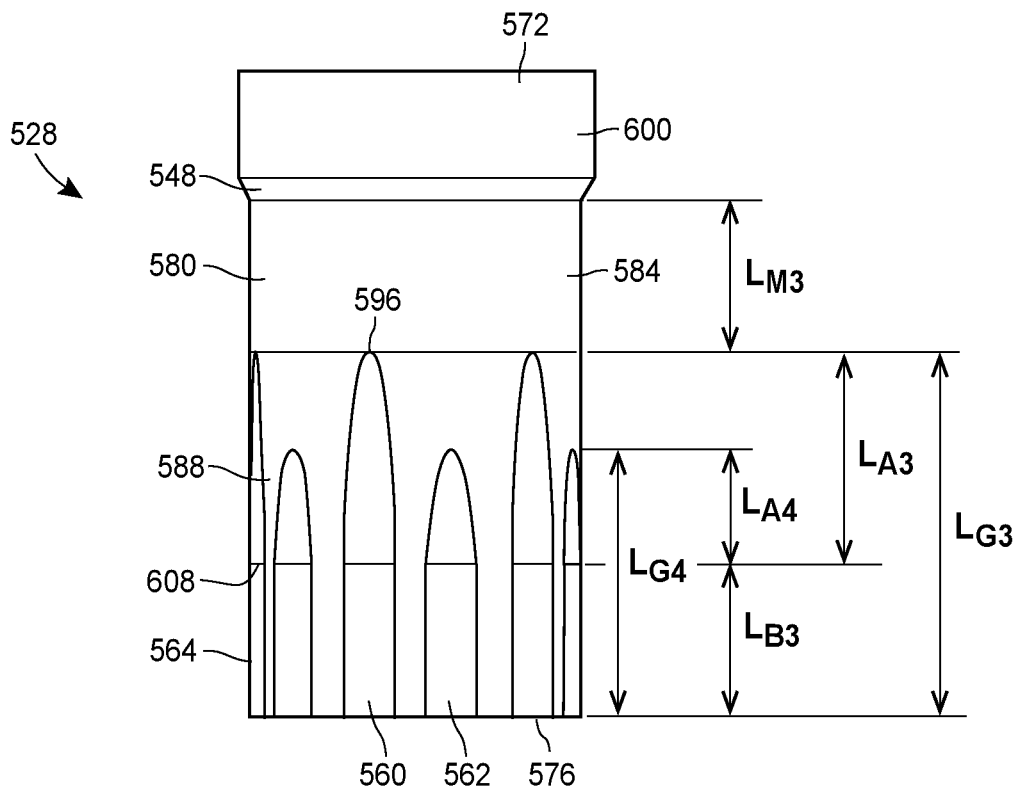
FIG. 10 is a third exemplary valve plug assembled in accordance with the teachings of the present disclosure.

The plurality of grooves 160 of the plug 128 in each of FIGS. 7 and 8 is uniformly spaced about the circumference of the plug body 180, and each groove 160 has the same dimensions (e.g., width, length, depth). However, in other examples, the smooth and grooved portions 184, 188 of the valve plug body 180 may be shaped and sized differently to achieve different flow distribution and conditions. For example, FIGS. 9 and 10 illustrate other exemplary valve plugs 328, 528, that can be coupled to (e.g., install on) the valve stem 126 of the injection valve 100 of FIG. 2. The second and third exemplary valve plugs 328, 528 are similar to the valve plug 128 of FIGS. 2-6 described above, with similar reference numbers used for similar components, but have different groove configurations. It will be appreciated that the second and third exemplary plugs 328, 528, when coupled to the valve stem 126, operate in slightly different manners than the plug 128 of FIGS. 2-8. Accordingly, for ease of reference, and to the extent possible, the same or similar components of the second and third exemplary valve plugs 328, 528 will retain the same reference numbers as outlined above with respect to the first exemplary valve plug 128, although the reference numbers will be increased by 200 and 400, respectively. As such, the valve plugs 328, 528, like the valve plug 128, shape fluid flow through the outlet 112 of the valve 100 depending on the position of the valve plug 128 relative to the seat ring 130.

The plug 328 in FIG. 9 includes a long dead band portion 384 such that a length $L_{M2}$ of the dead band portion 384 is substantially equal to a length $L_{G2}$ of a grooved portion 388. The dead band portion 384 is sized to cooperate with the seat ring 130 of the valve 100 such that the grooved portion 388 extends outside of the bore 136 of the seat ring 130. A plurality of grooves 360 of the plug 328 extends along the length $L_{G2}$ of the grooved portion 388 of the plug body 380. Similar to the first exemplary valve plug 128, the grooved portion 388 of the second exemplary valve plug 328 includes a non-uniform portion having a length $L_{A2}$ and a uniform portion having a length $L_{B2}$. The length of the uniform portion $L_{B2}$ is substantially equal to the length of the uniform portion $L_{B1}$ of the first exemplary plug 128, however, the length of the non-uniform portion $L_{A2}$ is shorter than the length of the non-uniform portion $L_{B1}$ of the first exemplary plug 128. This achieves a different flow characteristic as a plurality of channels formed between the seat ring 130 and the plug 328 increase in width and depth over a shorter distance $L_{A2}$ as the plug 338 moves toward a fully open position.

The plug 528 FIG. 10 has a combination grooved portion 588 with alternating grooves 560, 562. In this example, a first groove 560 is substantially similar to the groove 160 of the first exemplary plug 128 having a non-uniform length $L_{A3}$ and a uniform length $L_{B3}$ substantially equal to the non-uniform length $L_{A1}$ and the uniform length $L_{B1}$, respectively, of the first exemplary plug 128. Additionally, a second groove 562 is substantially similar to the groove 360 of the second exemplary plug 328, and has a non-uniform length $L_{A4}$ and a uniform length $L_{B3}$ substantially equal to the non-uniform length $L_{A2}$ and the uniform length $L_{B1}$, respectively, of the first and second exemplary plugs 128, 328. So configured, the third exemplary valve plug 528 travels a longer distance than the first exemplary plug 328 before the valve 100 fully opens, and less fluid flows around the plug 528 in a throttling position than the vale 100 of FIG. 2. As such, the third exemplary plug 528 may contribute to a different flow distribution during throttling of the injection valve 100.

In the examples of FIGS. 7-10, each of the valve plugs 128, 328, 528 is solid and does not include a bore that receives and couples to a valve stem, such as the valve stem 126 of FIG. 2. However, the valve plugs 128, 328, 528 disclosed herein may be modified to couple to (e.g., installed on) the valve stem 126 in other suitable ways. The valve plugs 128, 328, 528 may be simply manufactured using a ball mill, or other methods, such as EDM and additive manufacturing. The different valve plugs 128, 328, 528 are exemplary and may be configured in any desired manner. For example, a valve plug 128, 328, 528 according to the teachings of present disclosure may be customized to provide a particular flow distribution, flow profile, flow velocity, or other flow characteristic based on the application and/or the type of process fluid. The plurality of grooves 160, 360, 560 of the plug 128, 328, 528 may be tapered toward the second end or toward the first end of the plug 128, 328, 528, partially embedded within the plug body 180 so that channels are partially covered and partially exposed, curved, zig-zag, tortuous, linear, or a combination of shapes. The plugs 128, 328, 528 may include more or fewer grooves 160, 360, 560 with wider or narrower widths. The grooves 160, 360, 560 may be formed at a particular area of the plug 128, 328, 528 to delay throttling or initiate throttling sooner. In other embodiments, the plug 128, 328, 528 may include a different shape body 180, 380, 580, extending a different distance beyond the seat ring 130, and/or including a different coupling mechanism between the valve stem 126 and the plug 128, 328, 528. The plugs 128, 328, 528 may be permanently secured or attached to the valve stem 126, or the plugs 128, 328, 528 may be removably attached or coupled to the valve stem 126 such that a plug 128, 328, 528 may be switched out of a valve for another plug 128, 328, 528 for a different use and/or purpose.

Figure 11:
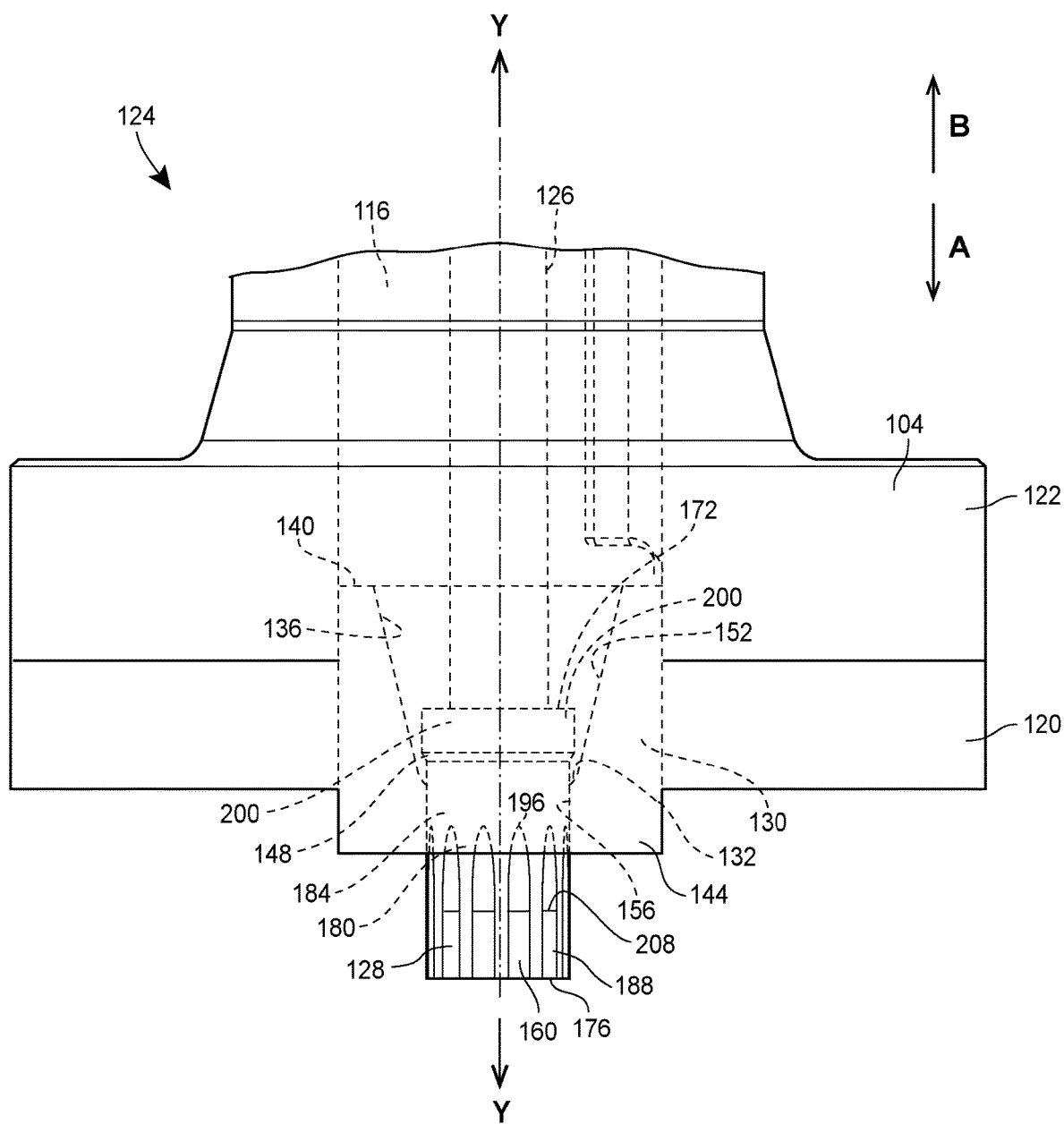
FIG. 11 is a partial side view of the valve trim assembly of FIG. 2, showing the valve in a dead band position.
Figure 12:
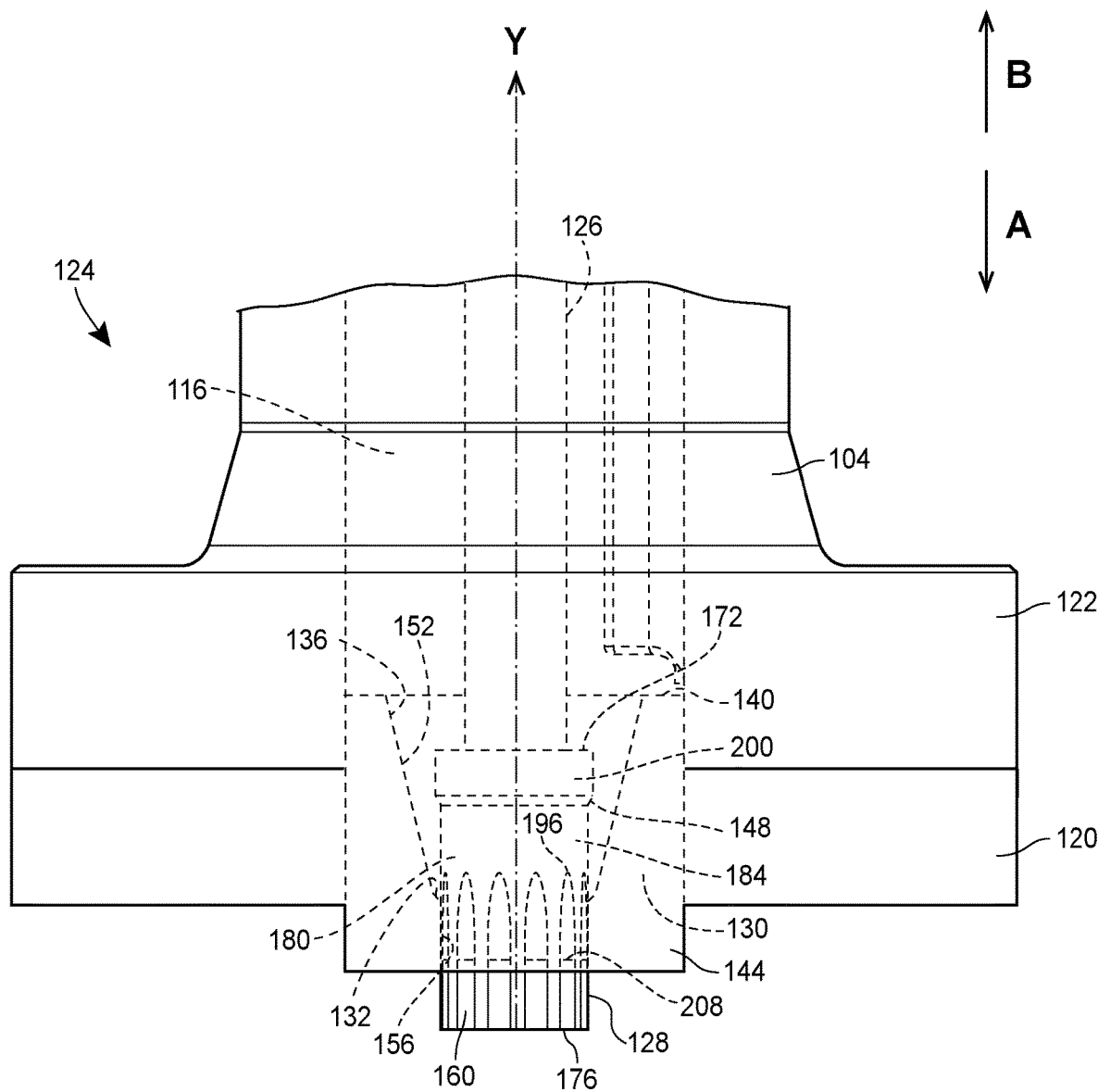
FIG. 12 is a partial side view of the valve trim assembly of FIG. 2, showing the valve in a throttled position.
Figure 13:
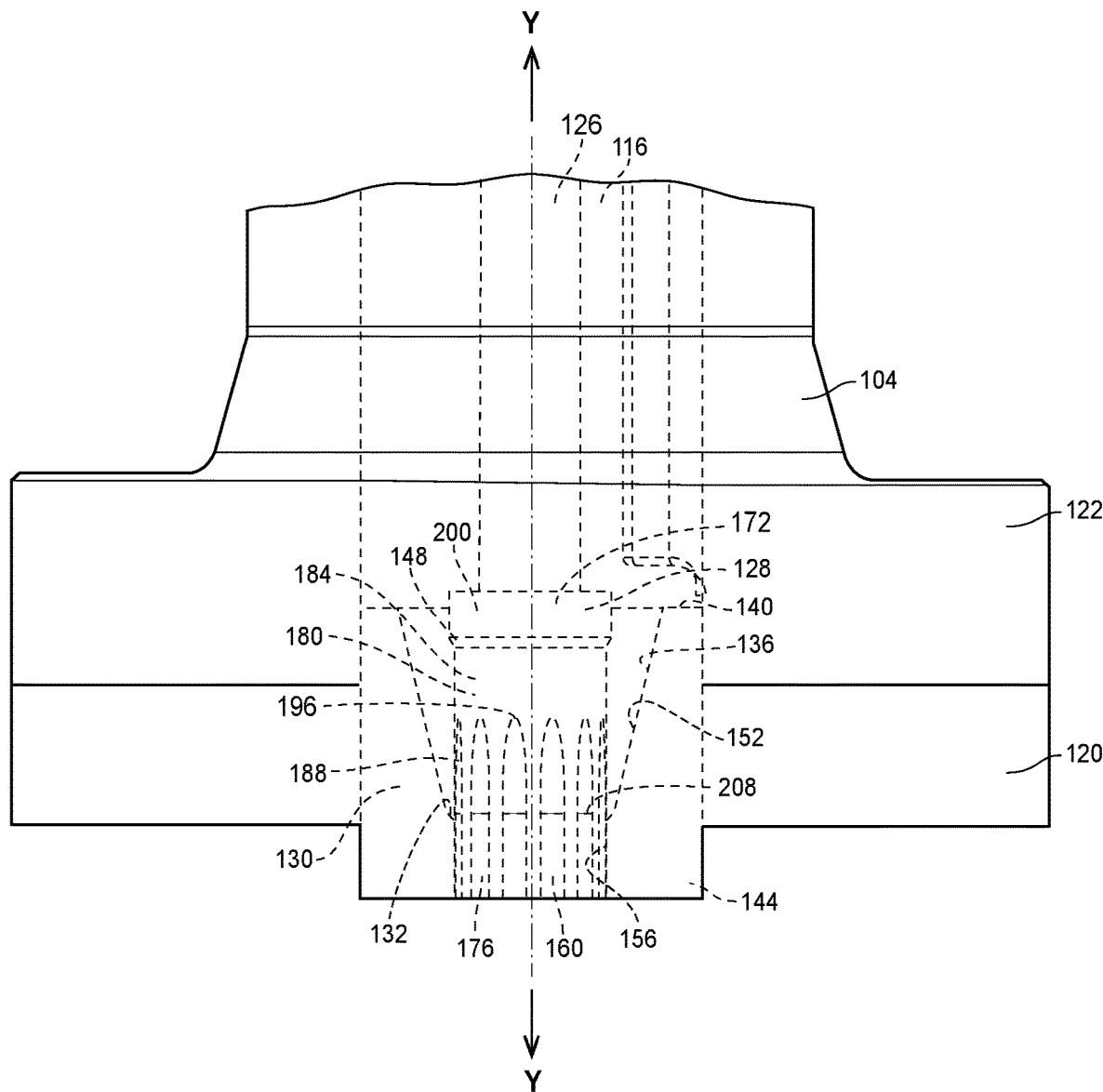
FIG. 13 is a partial side view of the valve trim assembly of FIG. 2, showing the valve in an open position.

Turning now to FIGS. 11-13, the valve trim assembly 124 of the valve 100 of FIG. 2 is illustrated at different stages of valve operation. In FIG. 11, the valve 100 is in a dead band position such that the seating surface 148 of the valve plug 128 is spaced away from the valve seat 132, while the grooved portion 188 of the plug body 180 is spaced from (i.e., not adjacent to) the cylindrical portion 156 of the bore 136 of the seat ring 130. In this position, the process fluid is kept from flowing through the outlet 112 via the opening defined by the valve seat 132 because the dead band portion 184 of the plug 128 is in sealing engagement with the bore 136 of the seat ring 130. As the plug 128 travels further in the direction B toward the valve body 104, the valve 100 moves into a throttling position as shown in FIG. 12. In the throttling position, the process fluid just begins to flow through the channels 192 defined between the plug 128 and the seat ring 130 and distributed around the circumference of the plug 128. The channels 192 are defined by the non-uniform portion $L_G$ of the grooved portion 188, and are at a low flow capacity profile to throttle the process fluid through the outlet 112. The valve 100 fully opens when the plug 128 moves further into the B direction such that the second end 176 of the plug 128 is adjacent to the second end 144 of the seat ring 130. In the fully open position in FIG. 13, the channels are defined by the grooves 160 at their widest and deepest dimension when the plug 128 is in a fully open position. Here, the grooved portion 188 of the plug 128 is completely drawn within the bore 136 of the seat ring 130, and the channels 192 are at their highest flow capacity profile.

So configured, when the plug 128 begins to move away from the valve seat 132, the channels 192 are very shallow, and as the plug 128 gradually opens, the grooves 160 become wider and deeper, thereby creating more flow area and increasing valve flow coefficient (Cv). The disclosed plug 128 provides low flows at low travels using a linear graduation (i.e., the dashed profile). However, in another example, the grooves may be shaped to provide a modified parabolic flow characteristic.

As the plug 128 moves back to the closed position, any debris or process fluid disposed in the plurality of grooves 160 or otherwise attached to the exterior surface of the plug 128 is scraped away from re-entering an interior cavity of the valve 100 by the seat ring 130. In this way, the valve trim assembly 124 is self-flushing, and benefits from the extended dead band area 184. Consequently, any process fluid stuck to the grooves 160 is pushed out of the valve 100 and into an interior volume of a tank, thereby reducing instances of the fluid hardening and rendering the valve 100 inoperable. While the first exemplary plug 128, seat ring 130, and valve body 104 are illustrated and described with reference to FIGS. 11-13 in the various valve positions, it will be appreciated that the other exemplary plugs 328, 528, seat ring 330, and body 304 described herein operate in a similar manner to provide additional features of the injection valve.

Figure 14:
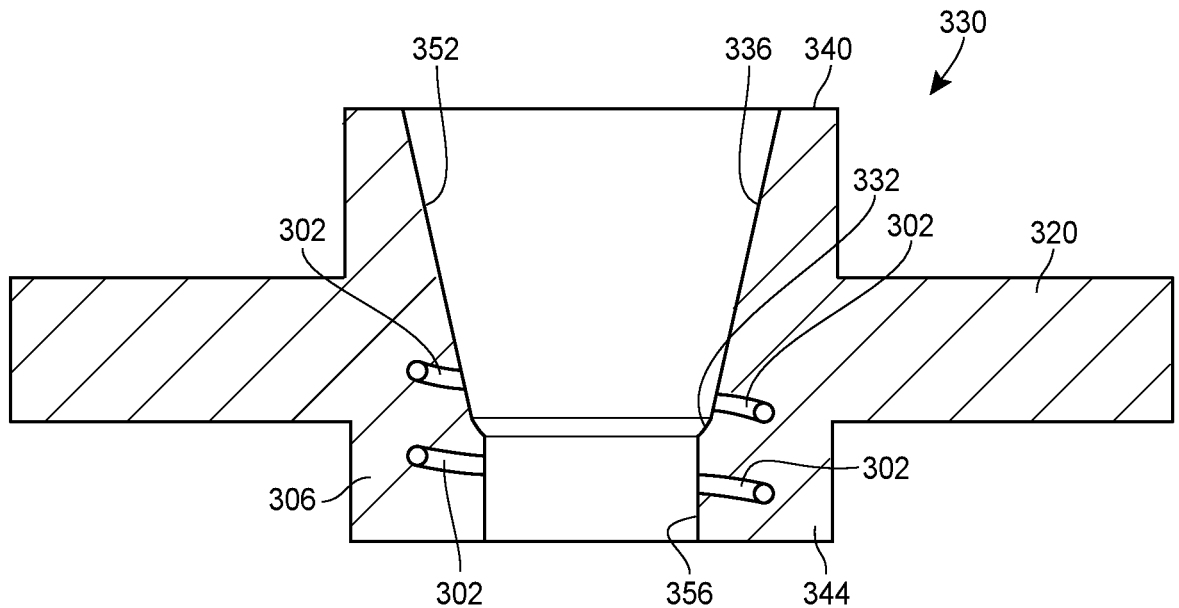
FIG. 14 is a cross-sectional side view of a second exemplary seat ring assembled in accordance with the teachings of the present disclosure, showing a heat tracing channel.
Figure 15:
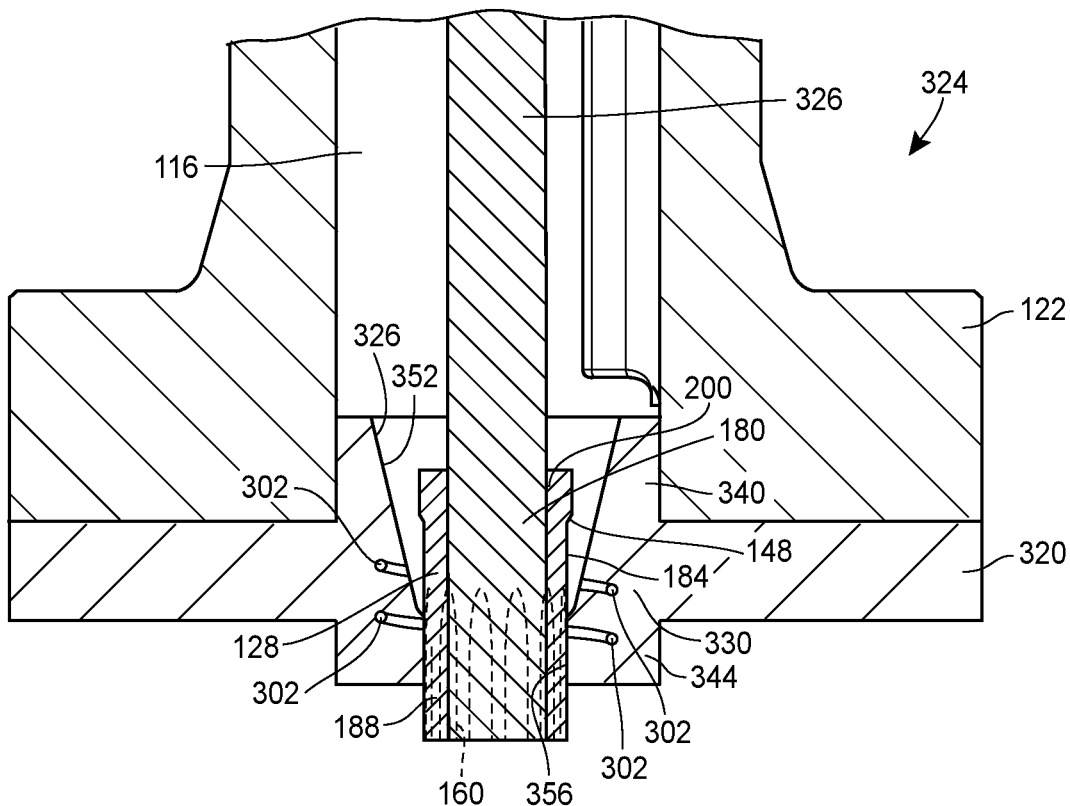
FIG. 15 is partial cross-sectional side view of a second exemplary valve trim assembly including the valve seat of FIG. 14 and the valve plug of FIG. 2.

FIGS. 14 and 15 illustrate another exemplary seat ring 330 and valve trim assembly 324 that can be coupled to (e.g., installed in) the valve 100 of FIG. 2 or the valve 300 described below in FIG. 16. The second exemplary seat ring 330 is similar to the seat ring 130 of FIG. 2, with similar reference numbers used for similar components, but has an integrated heat tracing channel 302 formed in a body 306 of the seat ring 330. It will be appreciated that the second exemplary seat ring 330, when coupled to the valve body 104 of the injection valve 100, for example, operates in a slightly different manner than the seat ring 130. Accordingly, for ease of reference, and to the extent possible, the same or similar components of the second exemplary seat ring 330 will retain the same reference numbers as outlined above with respect to the first exemplary seat ring 130, although the reference numbers will be increased by 200. As such, the second exemplary seat ring 330, like the first exemplary seat ring 130, defines an interior bore 336 having an integrated engagement mechanism arranged for engaging with a valve plug to distribute fluid flow through the outlet 112 of the valve body 104.

Similar to the seat ring 130 provided above, the second exemplary seat ring 330 includes a first end 340, a second end 344, and the interior bore 336. However, unlike the first exemplary seat ring 130, the second exemplary seat ring 330 has a tank mounting pad 320 integrated with the seat ring body 306 and includes the channel 302 disposed in the body 306 of the seat ring 330. The channel 302 of the seat ring 330 has a tortuous path that spirals around a circumference of the interior bore 336. However, in other examples, the seat ring 330 may have different configurations of one or more channels 302, with curved or linear flow paths.

In FIG. 15, the channel 302 is fluidly isolated from the bore 336 of the seat ring 330 and the fluid flow path 116 of the valve body 104. Rather, the channel 302 is in fluid connection with a heat exchange fluid source that pumps heated fluid into the channel 302 to keep the seat ring body 306 at a desired temperature to prevent the process fluid from cooling and hardening. In operation, heat exchange fluid may flow through the one or more channels 302 formed in the body 306 of the seat ring 330 to maintain a desired temperature of the process fluid during valve operation. The heat exchange fluid source may also pump cooled fluid into the channel 302 to lower the seat ring body temperature, depending on the application.

Figure 16:
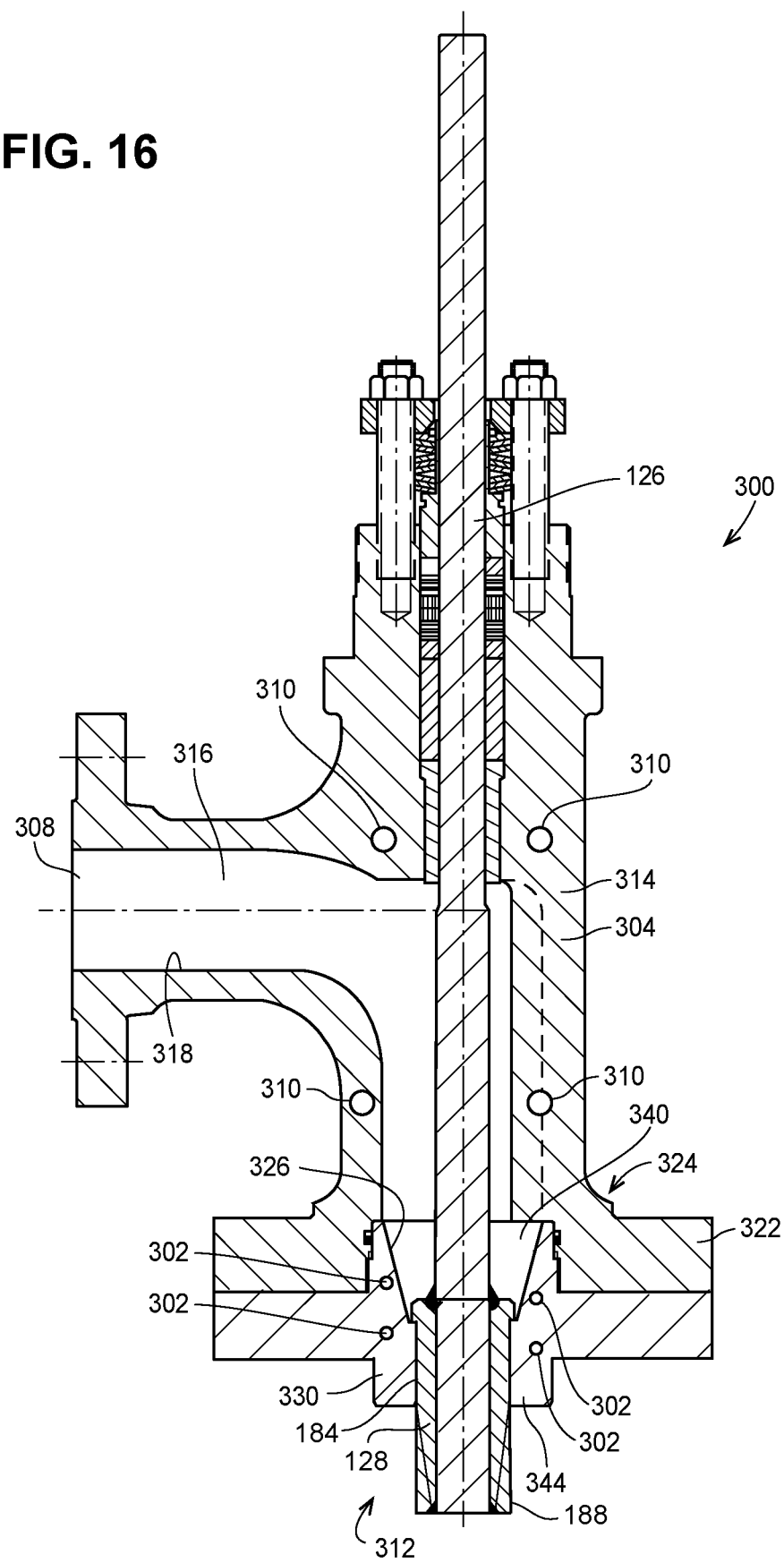
FIG. 16 is a cross-sectional side view of a second exemplary injection valve including a second exemplary valve body and the valve trim assembly of FIG. 15, assembled in accordance with the teachings of the present disclosure.

A second exemplary injection valve 300 in FIG. 16 includes a second exemplary valve body 304 that may replace the valve body 104 of the injection valve 100 of FIG. 2 to provide heat tracing channels 310. The second exemplary valve body 304 is similar to the valve body 104 of FIG. 2, with similar reference numbers used for similar components, but has integrated heat tracing channels 310 formed in a wall 314 of the valve body 304. It will be appreciated that the second exemplary valve body 304, when assembled with the other components of the injection valve 100, for example, operates in a slightly different manner than the valve body 104 of FIG. 2. Accordingly, for ease of reference, and to the extent possible, the same or similar components of the second exemplary valve body 304 will retain the same reference numbers as outlined above with respect to the first exemplary valve body 104, although the reference numbers will be increased by 200.

Similar to the valve body 104 of FIG. 2, the second exemplary valve body 304 of FIG. 16 includes an inlet 308, an outlet 312, and a fluid flow path 316 connecting the inlet 308 and outlet 312. However, unlike the first exemplary valve body 104, the second exemplary valve body 304 includes one or more channels 310 disposed in the wall 314 of the valve body 304. From the cross-sectional view of FIG. 16, the interior channels 310 are disposed in the wall 314 that surrounds a bore 318 defining the flow path 116 of the valve body 304. The channels 310 of the valve body 304 may have curved or linear paths, and may be interconnected to form one channel network having multiple branches. For example, the channels 310 may include angled turns within the valve body 304 to provide an inlet and outlet for each channel 310 or network of channels. In another example, the channel 310 may spiral around a circumference of the interior bore 318 defining the flow path similar to the configuration of the seat ring 330 of FIGS. 14 and 15.

The channels 310 are isolated from the flow path 316 of the valve body 304, and are instead in fluid communication with a heat exchange fluid source that pumps heated fluid (e.g., steam, oil, etc.) into the channels 310 to keep the valve body 304 at a desired temperature to prevent the process fluid from cooling and hardening within the valve body 304. In operation, heat exchange fluid may flow through the channels 310 formed in the walls 314 of the valve body 304 to maintain a desired temperature of the process fluid during operation of the injection valve 300. The heat exchange fluid source may also pump cooled fluid into the channels 310 to lower a valve body temperature depending on the application.

The valve body 304 and the seat ring 330 with integrated heat tracing channels of FIGS. 14-16 may be manufactured using an additive manufacturing technique to achieve desirable heat tracing channels throughout the valve body and/or the seat ring to maintain process fluid temperatures. The additive manufacturing technique may be any additive manufacturing technique or process that builds three-dimensional objects by adding successive layers of material on a material. The additive manufacturing technique may be performed by any suitable machine or combination of machines. The additive manufacturing technique may typically involve or use a computer, three-dimensional modeling software (e.g., Computer Aided Design, or CAD, software), machine equipment, and layering material. Once a CAD model is produced, the machine equipment may read in data from the CAD file and layer or add successive layers of liquid, powder, sheet material (for example) in a layer-upon-layer fashion to fabricate a three-dimensional object. The additive manufacturing technique may include any of several techniques or processes, such as, for example, a stereolithography ("SLA") process, a fused deposition modeling ("FDM") process, multi-jet modeling ("MJM") process, a selective laser sintering ("SLS") process, an electronic beam additive manufacturing process, an arc welding additive manufacturing process, or other additive manufacturing techniques. In some embodiments, the additive manufacturing process may include a directed energy laser deposition process. Such a directed energy laser deposition process may be performed by a multi-axis computer-numerically-controlled ("CNC") lathe with directed energy laser deposition capabilities. The valve body 304 and seat ring 330 may also be manufactured by molding and other known techniques.

In yet another example, the second exemplary valve body 304 and seat ring 330 may be assembled with one or more sensors embedded or otherwise integrated into the valve components for monitoring fluid flow through the injection valve. For example, a temperature sensor, vibration sensor, accelerometer, or other sensing device, may be integrated into the wall of each component. A sensor may be communicatively coupled to a controller, and may be programmed to receive and transmit data about the operation of the injection valve. In response to the sensor data, the controller may control the actuation of the injection valve, and/or communicate with the heat exchange fluid source to pump fluid into the heat tracing channels 310, 302 of the valve body 304 and/or seat ring 330 based on the data received by the sensor.

The exemplary injection valves 100, 300, including the exemplary valve trim assemblies 124, 324, valve plugs 128, 328, 528, and seat rings 130, 330, of the present disclosure provide a number of benefits over conventional injection valves. The injection valves 100, 300 of the present disclosure efficiently mix and distribute process fluid through the outlet 112, 312 and into the tank and keeps the process fluid from solidifying within the valve.

Each of the exemplary injection valves 100, 300 of the present disclosure is a push-to-close injection valve. By comparison, a conventional injection valve, like the valve 10 of FIG. 1, draws the valve stem 24 and plug 26 into the valve body 12 to close the valve 10. However, the conventional valve configuration may bring a viscous process fluid, either attached to the plug or seat ring 32, into the valve body, which can lead to solidification of the fluid on the plug 26 and in the outlet of the valve 10. In some cases, solidified process fluid can act as cement, securing the plug to the seat ring and valve body and rendering the valve inoperable.

The exemplary injection valves 100, 300, on the other hand, are effective for injecting a viscous polymer or other solidifiable material into a tank as each of the exemplary plugs 128, 328, 528 provides more uniform distribution of process fluid when the valve 100, 300 is open, and keeps the grooved portion of the plug externally located relative to the valve body 104, 304. First, the shape and groove arrangement of each of the exemplary plugs 128, 328, 528 disperse and shape fluid flow through the outlet 112, 312 of the valve 100, 300. By comparison to a conventional micro-flat plug, fluid flow is not concentrated at one location relative to the flow area through the seat ring and plug opening. Rather, the exemplary valve plugs 128, 328, 528 divert fluid flow around the plug 128, 328, 528 and through the circumferentially-disposed channels defined by the grooves and seat ring. The plurality of grooves 160, 360, 560 of each exemplary plug 128, 328, 528 provides a plurality of flow paths, which helps shape fluid flow through the outlet 112, 312, improve mixing, and facilitates throttling of the valve 100, 300. Moreover, the uniform circumferential placement of the plurality of grooves 160, 360, 560 of the plugs 128, 328, 528 also improves pressure distribution about the plug 128, 328, 528, thereby increasing plug stability and reducing plug vibration during operation.

Second, the dead band portion 184, 384, 584 of each plug 128, 328, 528 also ensures that the grooved portion 188, 388, 588 is disposed entirely outside of the valve body 104, 304 when the injection valve 100, 300 is closed. The interaction between the dead band portion 184, 384, 584 and the cylindrical portion 156, 356 of the seat ring 130, 330 also provides a self-flushing mechanism so that residual process material on the plug 128, 328, 528 does not re-enter the valve body 104, 304 when the valve 100, 300 moves from the closed position to the open position. Specifically, any process fluid attached to the exterior surface 164, 364, 564 of the plug 128, 328, 528 is scraped off as the plug 128, 328, 528 moves away from the valve seat 132, 332 and into the valve body 104, 304. This self-cleaning feature helps avoid process material from hardening and causing the plug 128, 328, 528 to stick in the valve 100, 300 when the valve 100, 300 is closed.

Finally, as compared to manufacturing micro-flat plugs, which require great precision. The plugs of the present disclosure may be manufactured by ball-mill, and do not require EDM manufacturing techniques.

The disclosed exemplary injection valves 100, 300, valve trim assemblies 124, 324, valve plugs 128, 328, 528, and seat rings 130, 330 described and illustrated herein may be combined to provide a number of different variations of injection valves. The components of the injection valves 100, 300 may be customized to achieve a different flow distribution, and are not limited by the illustrative examples provided herein. For example, depending on the process fluid and the application, an injection valve of the present disclosure may include any of the first, second, and third exemplary valve plugs 128, 328, 528 provided herein. Additionally, the first and second seat rings 130, 330 are arranged to cooperate with any of the valve plugs 128, 328, 528, and with any of the two exemplary valve bodies 100, 300 provided herein. As such, one exemplary injection valve may include the valve plug 328 of FIG. 9, the seat ring 130 of FIG. 2, and the valve body of FIG. 16. In this example, the valve body 304 includes heat tracing channels 310 and/or sensors to monitor and regulate the temperature of the process fluid flowing through the valve body 304. In another example, an injection valve may include both the seat ring 330 with the heat tracing channel 302 and the valve body 300 with the heat tracing channel 310. In yet another example, the valve plug and/or the valve stem may be modified to include heat tracing channels, as well. As such, any combination of the injection valve components described and illustrated herein is possible.

The figures and description provided herein depict and describe preferred examples of an injection valve for purposes of illustration only. One skilled in the art will readily recognize from the foregoing discussion that alternative variants of the components illustrated herein may be employed without departing from the principles described herein. Thus, upon reading this disclosure, those of skill in the art will appreciate still additional alternative structural and functional designs for components of an injection valve. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the methods and components disclosed herein without departing from the spirit and scope defined in the appended claims.

What is claimed:

1. A valve trim assembly for an injection valve, the valve trim assembly comprising:
    a valve plug including a seating surface and a plurality of grooves formed on an exterior surface of the valve plug;
    a seat ring including a first end, a second end opposite the first end, and a bore extending between the first and second ends, the bore of the seat ring terminating in a fluid outlet adjacent the second end of the seat ring, the first end operatively coupleable to a valve body and the bore sized to slidably receive the valve plug and the plurality of grooves, the bore defining a valve seat arranged to sealingly engage with the seating surface of the valve plug;
    the valve plug movable between an open position, in which the valve plug permits fluid flow between the inlet and the outlet, and a closed position, in which the valve plug limits flow between the inlet and the outlet;
    the valve plug further including a first portion having an exterior diameter sized to fit within the bore of the seat ring, a second portion having a diameter greater than the first portion and forming the seating surface of the valve plug, with the valve plug further including a smooth portion disposed between the plurality of grooves and the second portion of the valve plug, the smooth portion sized to engage an interior of the seat ring bore when the valve plug is disposed between the open and closed positions to define a dead band portion of the valve plug;
    wherein the valve plug includes a first end defining the seating surface, a second end opposite the first end, and a body extending between the first and second ends of the valve plug, the body including a grooved portion defining the plurality of grooves proximal to the second end, and further wherein the bore includes a cylindrical portion disposed adjacent the second end of the seat ring, and wherein the smooth portion of the body of the valve plug is encircled by the cylindrical portion of the bore when the seating surface of the valve plug engages the valve seat of the seat ring;
    wherein one or more of the plurality of grooves is partially elliptical with an apex adjacent to the smooth portion of the body of the valve plug; and
    wherein when the seating surface of the valve plug engages the valve seat of the seat ring, an entirety of the plurality of grooves of the valve plug are externally located relative to the outlet adjacent the second end of the seat ring.

2. The valve trim assembly of claim 1, wherein the plurality of grooves is disposed around a circumference of the valve plug.

3. The valve trim assembly of claim 1, wherein a ratio of length of the smooth portion to length of the grooved portion is in a range of 1:5 to 1:2.

4. The valve trim assembly of claim 1, wherein the one or more of the plurality of grooves increases in width and depth from the apex to a location spaced from the apex.

5. The valve trim assembly of claim 4, wherein the one or more of the plurality of grooves extends at a uniform depth and width from the location spaced from the apex to the second end of the valve plug.

6. The valve trim assembly of claim 1, wherein each of the plurality of grooves increases in one or more of width and depth from the smooth portion to the second end of the plug.

7. The valve trim assembly of claim 1, wherein the valve seat is disposed between the first and second ends of the seat ring.

8. The valve trim assembly of claim 1, further comprising a plurality of channels defined between the seat ring and the valve plug when the seating surface of the valve plug is spaced from the valve seat.

9. The valve trim assembly of claim 1, wherein the seat ring is threaded and directly coupleable to the valve body.

* * * * *